(12) United States Patent
Plimpton

(10) Patent No.: US 9,626,441 B2
(45) Date of Patent: Apr. 18, 2017

(54) CALENDAR-BASED SEARCH ENGINE

(75) Inventor: David Plimpton, Parkton, MD (US)

(73) Assignee: INOLEX GROUP, INC., Philadelphia, PA (US)

( * ) Notice: Subject to any disclaimer, the term of this patent is extended or adjusted under 35 U.S.C. 154(b) by 135 days.

(21) Appl. No.: 14/114,729

(22) PCT Filed: May 10, 2012

(86) PCT No.: PCT/US2012/037368
§ 371 (c)(1),
(2), (4) Date: Oct. 29, 2013

(87) PCT Pub. No.: WO2012/158469
PCT Pub. Date: Nov. 22, 2012

(65) Prior Publication Data
US 2014/0074815 A1    Mar. 13, 2014

Related U.S. Application Data

(60) Provisional application No. 61/486,137, filed on May 13, 2011.

(51) Int. Cl.
G06F 17/30 (2006.01)
(52) U.S. Cl.
CPC .. G06F 17/30864 (2013.01); G06F 17/30572 (2013.01); G06F 17/30991 (2013.01)
(58) Field of Classification Search
CPC ......... G06F 17/30572; G06F 17/30991; G06F 17/30864; G06F 17/30; G06F 17/3053; G06F 3/04842; G06F 19/322; G06F 17/30554; G06F 19/363; G06F 3/0482; G06F 17/30876; G06F 19/3431; G06F 17/30867; G06F 19/328; G06F 17/3099; G06F 17/40; G06F 3/04847; G06F 3/0485; G06F 3/04883; G06F 19/3481; G06F 19/3418; G06Q 10/109; G06Q 10/1095;

(Continued)

(56) References Cited

U.S. PATENT DOCUMENTS 6,591,300 B1  7/2003  Yurkovic ...................... 702/226
6,668,353 B1  12/2003  Yurkovic .................. 715/501.1

(Continued)

OTHER PUBLICATIONS

Max Van Kleek, Brennan Moore, and David Karger—"Atomate It! End-user Context-Sensitive Automation using Heterogeneous Information Sources on the Web"—Apr. 2010 WWW '10: Proceedings of the 19th international conference on World wide web—Apr. 26-30, 2010, Raleigh, North Carolina, USA. pp. 951-960.*

(Continued)

*Primary Examiner* — Anh Ly
(74) *Attorney, Agent, or Firm* — Hayes Soloway P.C.

(57) ABSTRACT

A computer system including a computer-readable memory unit; and a processor coupled to the memory unit. The processor is configured to provide a graphical image representing a search engine interface for display on a screen of the computer system, wherein the search engine interface comprises an arrangement of cells, each cell representative of a calendar unit of time; cause performance of a search, upon selection of a particular cell, wherein said search is based on the unit of time represented by the selected cell; and display the results of the search.

18 Claims, 3 Drawing Sheets

(58) Field of Classification Search
CPC .................. G06Q 40/04; G06Q 10/06; G06Q 10/063116; G06Q 10/063118; G06Q 10/107; G06Q 30/02; G06Q 30/0621; G06Q 30/0643; G06Q 10/1093; H04W 4/02; G09G 5/00
USPC ......... 707/709, 784, 610, E17.005, E17.017; 715/856, 772, 781, 753, 764, 35, 771, 715/835, 838, 968, 853; 370/252, 259, 370/360, 359, 377, 378, 389, 261; 455/456.3, 414.1
See application file for complete search history.

(56) References Cited

U.S. PATENT DOCUMENTS

| | | | | |
|---|---|---|---|---|
| 7,096,218 | B2* | 8/2006 | Schirmer | G06F 17/30648 707/767 |
| 7,251,612 | B1* | 7/2007 | Parker | G06Q 10/06312 705/7.22 |
| 7,392,041 | B2* | 6/2008 | Brush et al. | 455/414.1 |
| 7,398,479 | B2* | 7/2008 | Hooper | G06F 17/30265 707/999.1 |
| 8,015,494 | B1* | 9/2011 | Hull et al. | 715/746 |
| 8,078,481 | B2* | 12/2011 | Steinbarth | G06Q 10/10 705/1.1 |
| 8,572,649 | B1* | 10/2013 | Gossweiler et al. | 725/39 |
| 2003/0200192 | A1* | 10/2003 | Bell et al. | 707/1 |
| 2004/0015566 | A1* | 1/2004 | Anderson | G06F 17/30221 709/219 |
| 2004/0064567 | A1* | 4/2004 | Doss | G06Q 10/109 709/228 |
| 2004/0085578 | A1* | 5/2004 | Quek et al. | 358/1.18 |
| 2005/0005483 | A1* | 1/2005 | Bianco | 40/107 |
| 2005/0240512 | A1 | 10/2005 | Quintero et al. | 705/37 |
| 2007/0032244 | A1* | 2/2007 | Counts et al. | 455/456.1 |
| 2007/0143398 | A1* | 6/2007 | Graham | 709/204 |
| 2007/0204308 | A1* | 8/2007 | Nicholas | H04N 7/17318 725/86 |
| 2007/0244900 | A1* | 10/2007 | Hopkins | G06F 17/30873 707/E17.111 |
| 2008/0082925 | A1* | 4/2008 | Brush | G06Q 10/1093 715/744 |
| 2008/0104542 | A1* | 5/2008 | Cohen | G06F 17/30864 715/810 |
| 2008/0126465 | A1* | 5/2008 | Delaney | 708/490 |
| 2008/0201647 | A1* | 8/2008 | Lagerstedt | G01W 1/02 715/748 |
| 2009/0007198 | A1* | 1/2009 | Lavender | H04N 7/163 725/91 |
| 2009/0094211 | A1* | 4/2009 | Marvit | G06F 17/30864 707/E17.014 |
| 2009/0157513 | A1* | 6/2009 | Bonev | G06F 17/30029 705/14.69 |
| 2009/0158173 | A1* | 6/2009 | Palahnuk | G06Q 30/00 715/753 |
| 2010/0022225 | A1* | 1/2010 | Benger | G06Q 10/109 455/414.1 |
| 2010/0087230 | A1* | 4/2010 | Peh | G06F 3/04817 455/566 |
| 2011/0035400 | A1* | 2/2011 | Nishida | G06Q 30/02 707/769 |
| 2011/0035403 | A1* | 2/2011 | Ismalon | G06F 17/3064 707/769 |
| 2011/0184768 | A1* | 7/2011 | Norton | G06Q 10/02 705/5 |
| 2011/0202439 | A1* | 8/2011 | Ricci | G06Q 30/04 705/32 |
| 2011/0202594 | A1* | 8/2011 | Ricci | H04M 3/4931 709/203 |
| 2011/0235468 | A1* | 9/2011 | Hoch et al. | 368/10 |
| 2011/0301982 | A1* | 12/2011 | Green, Jr. | G06F 19/3443 705/3 |
| 2012/0022892 | A1* | 1/2012 | Feldman | G06F 19/322 705/3 |
| 2012/0069131 | A1* | 3/2012 | Abelow | G06Q 10/067 348/14.01 |
| 2012/0185498 | A1* | 7/2012 | Loofbourrow | G06F 17/30395 707/767 |
| 2012/0198389 | A1* | 8/2012 | Audet | G06F 17/30011 715/853 |
| 2012/0209839 | A1* | 8/2012 | Andrews | G06Q 10/10 707/728 |
| 2013/0042189 | A1* | 2/2013 | Hull et al. | 715/764 |
| 2013/0254687 | A9* | 9/2013 | Hull et al. | 715/764 |
| 2014/0040784 | A1* | 2/2014 | Behforooz | H04L 65/403 715/758 |
| 2015/0294377 | A1* | 10/2015 | Chow | G06Q 30/0263 705/347 |
| 2016/0165307 | A1* | 6/2016 | Lavender | H04N 21/4627 725/29 |

OTHER PUBLICATIONS

Doug L. Simpson—"Content for One: Developing a Personal Content Management System"—Published in:• Proceeding SIGUCCS '05 Proceedings of the 33rd annual ACM SIGUCCS conference on User services—Monterey, CA, USA—Nov. 6-9, 2005—pp. 338-342.*

PCT International Search Report issued in corresponding application No. PCT/US12/37368, dated Jul. 16, 2012 (6 pgs).

International Preliminary Report on Patentability issued in related application No. PCT/US2012/037368, dated Apr. 3, 2014 (5 pgs).

* cited by examiner

Traditional Search Engine (example: Google):

Traditional Monthly Calendar:

Fig. 4
Traditional Monthly Calendar with embedded Traditional
Search Engines
"A Calendar-based Search Engine"

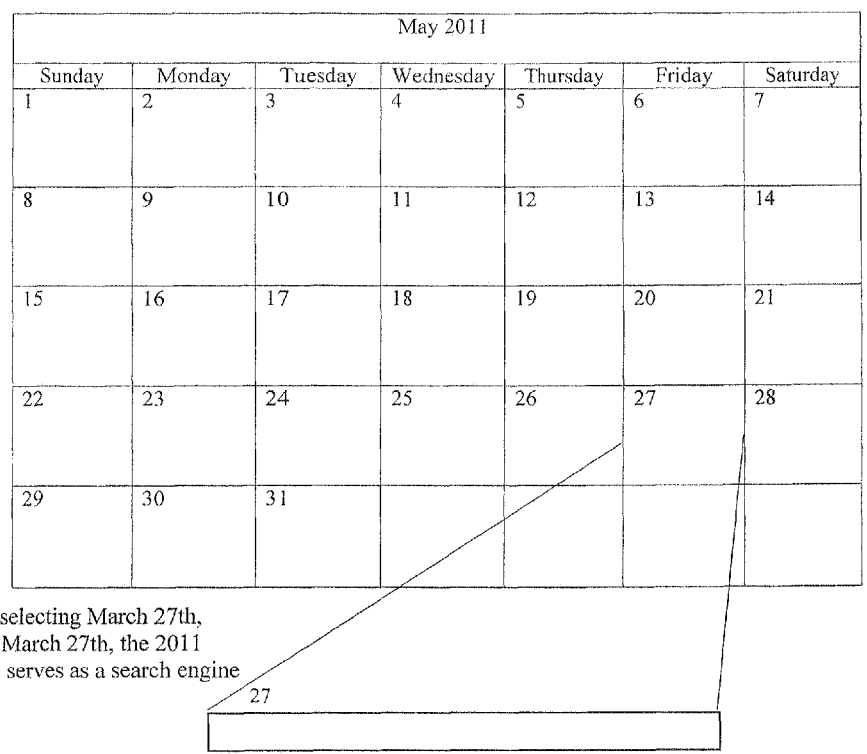

By selecting March 27th,
the March 27th, the 2011
cell serves as a search engine +without keyword entry, results are displayed for all calendar data, per traditional search, for any calendar or event information for March 27$^{th}$, 2011

+with keyword entry, and/or location based services, results are displayed specific to the keyword and/or location entered AND specific to March 27$^{th}$, 2011

CALENDAR-BASED SEARCH ENGINE

The present invention relates to a new methodology, a new system, and a new paradigm for manipulating, retrieving and viewing information on the internet. The invention uses the calendar as the principal interface for search.

The invention uses the calendar interface as the principal user tool for searching and displaying in various forms both world wide web and private database sourced information.

The invention allows users a new means for searching network-based information—information which is traditionally viewable on personal computers, mobile & handheld devices (including, but not limited to webpages, websites, blogs, wikis, and data/media rich information accessible by hyperlinks, etc.). Local, non-networked data may also be searched by the present invention, although the invention will be described primarily in relation to the searching of web-based information.

BACKGROUND

Search engines typically work by providing a simple text box within a graphical user interface (FIG. 1 and Appendix A). In order to conduct a search, a user must compose keywords by entering the desired text, and then direct the search engine to search for documents containing those keywords by, for example, pressing the enter key or clicking a mouse on a "search" box. If a user wishes to retrieve information relevant to a particular date, or time, the user must enter that date into the text box and run the search.

Electronic calendars are known which allow a user to enter scheduled appointments and other events into boxes or some other graphical representation of a unit of time, such as a day. However, such calendars typically only contain information input by a user. Thus, in order to be useful, a user of known electronic calendars must frequently update calendar information by manually inputting new or changing events.

Thus, there remains a need in the field for a graphical user interface which provides an electronic calendar, and further allows a user to retrieve date- or time-specific information over the Web with a single command.

The present disclosure is directed to a graphical user interface and a computer system that overcome the aforesaid and other disadvantages of the prior art.

In one aspect, the present disclosure provides a graphical user interface for performing a web search by a computer device, which includes a computer-readable memory unit and a processor, and includes an arrangement of cells configured to be displayed on the computer device, each cell representative of a calendar unit of time, wherein said cells are configured to display results of a web search upon selection of a cell by a user, wherein said web search is performed based on the unit of time represented by the selected cell.

In another aspect, the present disclosure provides a computer system that includes a computer-readable memory unit and a processor coupled to the memory unit, the processor configured to: provide a graphical image representing a search engine interface for display on a screen of the computer system, wherein the search engine interface comprises an arrangement of cells, each cell representative of a calendar unit of time; cause performance of a search, upon selection of a particular cell, wherein said search is based on the unit of time represented by the selected cell; and display the results of the search.

More particularly, the present disclosure provides a calendar-based search engine, which in its simplest form, uses the traditional calendar as the principal means of search, with each unique date operating as a unique search engine. By selecting a date (the specific calendar "box" or "cell" or number of a traditional monthly calendar), this date-specific search engine retrieves all web-based information specific to the selected date.

The features, functions and advantages that have been discussed can be achieved independently in various embodiments of the present disclosure or may be combined in yet other embodiments, further details of which can be seen with reference to the following descriptions and drawings.

Further features and advantages of the invention will be seen from the following detailed description taken in conjunction with the accompanying drawings, wherein FIG. 1 illustrates a conventional search engine;

FIG. 4 illustrates a system for executing a search and displaying the results of the search in accordance with the present invention.

DETAILED DESCRIPTION

Figure 1:

Many embodiments of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

The invention also can be practiced in distributed computing environments, where tasks or modules are performed by remote processing devices that are linked through a communications network. Moreover, the invention can be practiced in Internet-based or cloud computing environments, where shared resources, software and information may be provided to computers and other devices on demand. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

The invention as a calendar-based search engine, in one embodiment, generally employs a graphical user interface which displays a calendar-view as the principal means of search, with each unique date operating, in a sense, as a unique search engine. By selecting a date (the specific calendar cell, or number of a traditional monthly calendar), this date-specific search engine retrieves all web-based information specific to the selected date.

1. Employing the Calendar as a Template/Search Interface

All current & future calendars may be employed as search interfaces for searching any current & future web-based information. Past calendars also may be used as a search interface, in accordance with an aspect provided by the present disclosure; however, search interfaces comprising current and future calendars are a preferred embodiment of the present invention, and the invention will thus be described primarily with respect to current and future calendars.

In one embodiment, the current monthly calendar is displayed.

Typically, a monthly calendar is made up of a grid, usually containing some number, for example 35, squares. Most are remarkably similar, 7 columns displaying days of the week×5 rows of numbers. Monthly calendars typically have 28-31 cells of bounded space, often in the shape of rectangles or boxes, with dates, and 4-7 without dates (or displaying a few dates for the prior or upcoming month, as best understood by looking at a traditional monthly calendar). However, the invention provided by the present disclosure contemplates and may employ other types of calendars, monthly or otherwise, including for example, for leap years, and other 'calendars' that are less traditional (e.g. religious, cultural and other calendars that differ from the nearly ubiquitous Gregorian calendar system in current use).

Figure 2:
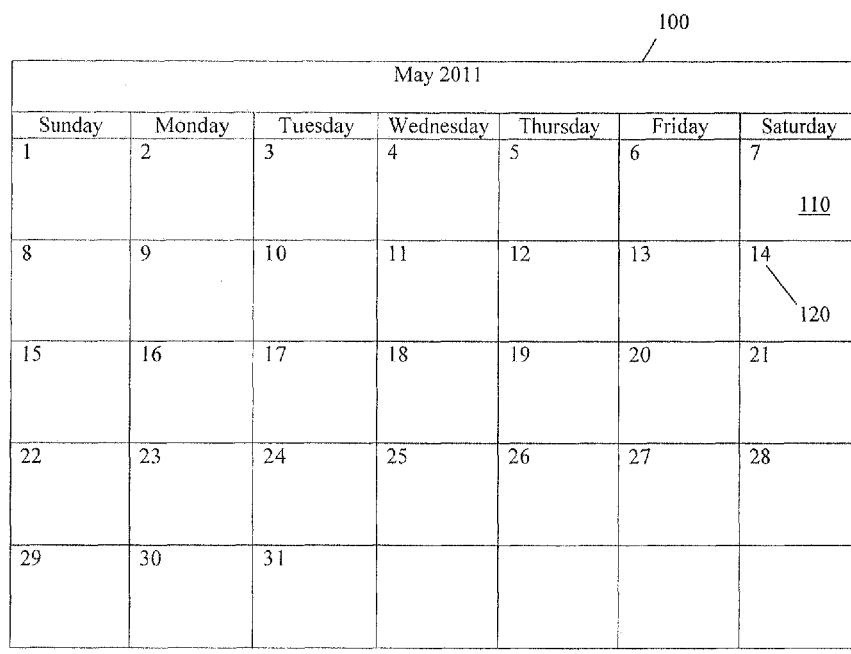
FIG. 2 illustrates a graphical user interface in accordance with an embodiment of the present disclosure.

FIG. 2 illustrates a graphical user interface 100 of the calendar-based search engine provided in one aspect of the present invention. The interface is composed of 35 individual cells 110. The arrangement of all of the cells into a grid represents one month (in this exemplary case, May, 2011), and each individual cell 110 represents a single day within the month. Numerals 120 may be included which denote the number of the day within the month.

2. Adding Search Engine Capabilities to Each Calendar Day

In one embodiment of the present invention, each calendar day ("box" or "cell") is designed to serve, in a sense, as an individual search engine. Search engines (e.g., Google, Bing, Yahoo!, AOL, Baidu, and others), as well as the search engine-related processes of web crawling, indexing and searching, are generally well-known within the relevant field and are described, for example, at http://en.wikipedia.org/wiki/Web_search_engine.

Each calendar box is pre-configured to retrieve date-specific information for each particular date. By touching/clicking the number or box, the search commences (the "touch" or "click" will correlate to the type of device or browser being used. e.g. iPad vs. desktop)

With no information entered, the search simply retrieves all information specific to the date desired. Note: this is different than known search engines. If no information is entered into a known search engine (e.g. Google), no information results are displayed. Similar to known search engines, results can be displayed in order of relevance, priority, or popularity (even with no search terms entered), using well-known search engine capabilities and techniques. If search terms are entered, the search commences with results in order of relevance, priority, or popularity, specific to the specified date and the specific to the terms entered.

Users may further have the "opt-in" function of allowing location services enabled to prioritize results for their location. Such opt-in functionality and location obtaining services are known in the art.

Users may further have the ability to insert search terms such as keywords or phrases, thereby providing increased specificity to the search engine, and time and date desired.

The search seeks to deliver only date-specific information—information for that date which is specified (this is accomplished using well-known techniques within the relevant field, including 'webcrawlers', 'bots', and 'spiders' which seek the specific information, and also may be further accomplished with filters to block erroneous data related to historic or other dates).

In a preferred embodiment, the search interface comprises a monthly calendar view; however, weekly, daily, hourly, annual, or any other time-increment view interfaces are provided by the present disclosure.

The present invention provides a number of ways to refine a search.

a. "General Search"

The time/date search can commence with no unique information provided—by clicking May 22, 2011—all data tags for that date are retrieved.

b. "Location Search"

The time/date search can commence with the addition of location based services enabled (e.g., by enabling well-known location obtaining techniques) and/or location specified by the user. By clicking/touching May 22, 2011, for example, all data tags for that date are retrieved for the area the user is located (via location based services) or for the area specified (i.e. zip code, intersection, or even compass point).

c. "Keyword Search"

The time/date can commence with keyword (and/or location services)—by touching/clicking May 22, 2011—with location services enabled and/or area specified—a user can enter a topic of interest (i.e. sports, weather, concert, entertainment).

3. Settings for User Preferences ("Personalization")

The "default setting" of the opening screen ('viewfinder' or 'calendar view') of the invention is a blank monthly calendar, displaying the current month (as depicted in FIG. 2, however, any month may be displayed, typically the current month). Features, such as arrows, tabs and/or links, or the like, may be provided with the calendar-view to allow users to select a desired month if different that the current month.

A grid of "boxes" or cells (for example, 35 cells) with only relevant numbers depicting the dates or other calendar unit of time and the ability to search via the boxes is provided.

This blank "grid", is the universal 'setting' for all users. However, many users will want to customize their own grid with their own personal settings.

User Preference Setting, Example (1): Appearance ("Look & Feel")

Users may choose a daily, weekly or annual view of calendars, and other color/graphical aesthetics.

User Preference Setting, Example (2): Location

In addition to location based services, as mentioned above, a user's grid might be pre-set with their 'home address' set as the specified location, or it might include multiple 'favorite locations', to display simultaneously or separately. Location might be as specific as a compass point, a street address, a zip code, county, state or country. A location setting could be a general as global.

User Preference Setting, Example (3): Incorporating a Personal Calendar

A user may wish to use the invention as a traditional calendar, populated with their own appointments and events, yet with the search feature to identify, find & retrieve information specific to those dates & locations. The personal use of the invention does not require a user to add any information (appointments, conferences, events)—the user can simply use the calendar interface as a search engine, adding new information to their personal calendar from the results, or by subscribing to public or private data feeds. Adding personal information, personal appointments, is optional. This makes it possible to use the invention as a passive recipient, or as an active user as desired.

In another embodiment, the calendar-based search features of the present invention may be incorporated into an existing calendar application. That is, a number of well-known calendar applications currently exist (e.g., Google Calendar, Microsoft Outlook, Yahoo Calendar, iCal, Lotus Notes, etc.) which may provide, in some sense, a monthly or other calendar-based view. The present invention may be incorporated into such calendar applications by providing a date or other calendar time unit specific search feature into each of the cells of the pre-existing calendar application.

In another embodiment, in addition to the existing calendar-based search interface, users can start with a blank 'grid' (i.e. an unpopulated personal calendar) and then may opt into any published schedule to create their own custom calendar, or to use this as their personal calendar (independent of well-known calendar applications that currently exist).

User Preference Setting, Example (4): Being an Organizer, or 'publisher'
('ACTIVE USER': using the invention to provide certain data and data feeds to others)

To allow individuals, corporations, non-profits, government entities, and civic organizations, and others, the means to create and post their own current and future, calendars and schedules for general 'broadcast' (publication) or strictly privately, for the benefit of their invitees. In this sense, the organizer, or 'publisher' is an ACTIVE USER—actively organizing and publishing information to populate current and future, calendars and schedules.

In this manner, users "publish" their own calendar (or certain events), to make it viewable to other users. As a website owner, organizations are typically already 'publishers' of calendars & schedules. However, by use & definition, these calendars & schedules are static. The invention allows institutions a broader ability to disseminate information for users to view, search, and subscribe. A publisher may opt to make this as public (open) or as private (by invitation) as desired and specified.

In a sense, this becomes a "news feed" (e.g., much like RSS). This might be to solicit volunteers, attract customers, or (for individuals) simply a means to invite friends, classmates and others to "follow", "track", (or participate in) their activities.

In a further aspect, the present invention provides a repository of future calendars for users to search and customize based on their own time & date, location & interests. Such a 'universal calendar' allows any current or future event to be added—in the format of a calendar. With such an approach, anyone can be a 'publisher'—replicating, transferring, or self-posting their calendar data for universal viewing, as desired. Perhaps most common, institutions already publish calendars for the purpose of informing and attracting the general public, their members or individuals to sponsored events. In an aspect, the present invention may thus obtain any published calendar information (e.g., through the use of web crawlers and other known techniques) and then make this calendar information available through the system of the present invention to other users.

User Preference Setting, Example (5): A user as a 'Subscriber'
('PASSIVE USER': using the invention to receive certain data feeds from others)

A user may wish to 'subscribe' to certain events published by other users. In this sense, the user is a PASSIVE USER, passively receiving information and data to populate their own calendar and schedule. These events to which the passive user subscribes are perhaps most often published by a sponsoring organization or institution (per earlier reference). Selected events (or calendar news feeds—much like RSS) can be added to their personal calendar (e.g. subscribing to "Susan G. Komen, Race for the Cure")

'Users' are typically individuals—those who want to view and search available calendar data by date, browsing dates and calendar data (akin to 'searching the web') and narrowing down their desired search by time & date (using calendar "grid" as interface—as a "dashboard").

Users may be employees, members, voters, volunteers, attendees, customers—any form of constituent of a publisher. Many individuals and institutions will be both publishers and users of the invention.

Almost universally, companies already publish some form of a calendar for corporate events. Schools publish sports and other schedules, state and local governments publish legislative schedules and trash pick-up schedules, churches publish service time and volunteer schedules, political groups publish for meetings and rallies. The use of calendars is common to all, and the simplest form of meeting and event planning. Furthermore, even groups with a loose affiliation of members often publish for the purpose of bringing people together on a common day, at a common time & location, for a common purpose.

Similarly, also almost universally, any company or other organization with a website generally 'publishes' a calendar (albeit 'static') to their website. Most often, these are calendars for public viewing (and use).

Two very different and extreme examples from one another are provided to further illustrate this point. The organizers of a 'flash mob', organizing groups of people to congregate at a specific location at a specific time for sometime outrageous activities (e.g. pillow fight) or 'spontaneous' performances, or perhaps the other extreme—simply a library with a book club that brings people together at a specific location at a specific time for a common purpose.

The present disclosure further makes possible the creation of a universal 'pro forma calendar', as discussed below.

All searchable data with date & time tags (characteristics) may become part of a universal calendar, that can be viewed in the traditional grid of the calendar.

As described earlier, the invention allows a user to instantaneously receive all current & future event information, thru the calendar "grid", based on a user's set preferences current (or desired) location.

This information would be constantly updated by "publishers", and constantly grown by other public domain and commercial data feeds, and by individuals and institutions as previously described as likely "publishers"

Such an immense body of data, so easily searchable by date & time, provides for some colorful potentialities: a pedestrian on a parade route in NY can enters a location of an intersection (e.g. 5th & 55th streets), a homemaker in Springfield, USA enters a Zip Code (e.g. 21120), or a spelunker in Nevada enters a compass point (39 degrees 35′45″ N, 76 degrees 41′21″ W)—all able to view all future information specific to that location. Information as narrowly defined or as broad as desired. The pedestrian in NY, the homemaker in Springfield, or the spelunker can quickly indicate a date and view what (if anything) is scheduled to take place in that location on that day.

A resulting search, populated into a calendar might be global (i.e. Celebrate Earth Day on April 22, Memorial for the victims of the Japanese Tsunami on March 11)—or might be as specific as compass coordinates of a barrier reef for scuba diving.

With a density of searchable calendar data, a user can select 'Times Square NY' as an area of general interest, and while standing at (or selecting) that location flip thru everyday, or select days throughout the years, to see what 'events' are scheduled . . . every New Year's ball drop, every promotion, every parade for every day of every year . . . (so long as that event is available on an existing calendar or schedule, it by definition has an associated date & time that can be identified by a web search, or has otherwise been "published" and made available thru organizational or individual users)

In viewing future dates, allows the user the ability to 'flip thru' a (passive) calendar populated with all future events for that compass coordinate or address, or town, state . . . etc. In so doing, a common user can quickly populate a personal calendar with as much or as little information of interest by "selecting" that information to be added. Often along with this time & date event information will be associated information such as maps, driving directions, coupons, points of interests, other links, all of which can be added to the personal calendar as desired.

In more practical terms, for those who are regular users of web data, this is easily understood. This reduces the need to search for an organization's website (or where the organization's calendar is posted on the website) to find event information. In practical everyday life, one of the most common routines is doing just this. The invention, however, allows for individuals to search singularly for calendar (event) data. The invention allows the user to repeatedly ask the question "what is happening in 'x' place at 'y' time" and retrieve results. As previously described, by location based services (or otherwise) the location is established, and by using the calendar based interface, the time & date is selected—and, if desired, user then can become a subscriber to the publisher's content.

In a sense, the invention follows the way we all think & conceptualize.

Travel, and oftentimes general living, is planned around a single purpose, for example, a trip to a wedding in San Francisco, a day at the Met in New York City, traveling to a regatta in Annapolis, Md. Most is done with singularity of purpose, and oftentimes on short notice.

How does one currently "fill their schedule" or even comprehend other activities that may be of interest in a similar place at a similar time? Generally, in current times, it's still done by browsing the web—thru specific searches (such as local news), local venues, or general commercial portals (e.g. ticketmaster). This requires a proactive outbound search to websites and their static calendar data—oftentimes a never ending search, as the broad number of websites provides countless options. However, most often, the single purpose trip is by definition a fixed date on the calendar, and becomes an 'anchor' to other plans.

With help of the invention, the user BEGINS by choosing the date, adding the location, and immediately benefits by being able to view results from the local, regional, calendar—and checking surrounding dates.

More About Calendars—to Illustrate Usage

Each month, each day, of every year is distinct by definition. While scheduling & 'calendaring' can be understood as common language, each month can effectively be viewed as a distinct symbol.

May 2011, for example, is a 'grid' distinct unto itself. Even without the days of the week listed, and without the month listed, those living in April 2011, or May 2011, quickly and inherently can understand the meaning of the May 2011 grid.

As described herein, the present invention provides the monthly calendar as a search interface, or a 'viewfinder' for information. When a user clicks on a particular day, as with many well-known computer calendar applications (e.g. e.g., Google Calendar, Microsoft Outlook, Yahoo Calendar, iCal, Lotus Notes, etc.), a daily listing of scheduled events, etc. may be displayed.

Active Content Creation & Management

In another aspect, the present invention provides the ability to create directories of usable calendar data, and generate new data (properly tagged for search, and compatible with the invention). The invention may compile, create and index content from the following sources:

a. Information in the Public Domain

As mentioned earlier, a critical mass of usable calendar data will come from free public information from information in the public domain (static information). This will include all religious, cultural, holiday, commemorative, and regional specific calendars . . . including major events such as the royal wedding in Apr. 29, 2011, the remembrance of the terrorist attacks of 9/11, the Olympics and the meeting of the United Nations. This information may be compiled into calendar data, and indexed for retrieval by search.

The invention, in one aspect serves to help organize (re-organizing) data that already exists.

b. Subscription to Free News Feeds

Free news feeds in common use by newspapers, TV, movie, radio and cable outlets. Oftentimes these same sources want information published to build their viewer base. Such information may be utilized by the present invention.

c. Purchase and Addition of Commercial Data Feeds

Licensed data feeds for weather forecasts, farmer's almanac, traffic (road closures), future business reports (unemployment data release, farm futures), sports schedules or other listings protected by copyright may be utilized.

d. Web Crawler/'bots'/'spiders'

To further critical mass, and ongoing growth, automatic content creation may be developed by programs searching the internet looking for content that is future date-specific. Web crawlers, bots and spiders, as well as other internet searching and indexing methods, are well-known and may be utilized with the present invention. Other irrelevant information may be filtered. As an example news articles are by definition past events and likely eliminated, unless they contained information announcing a future event.

e. Manual Entry

In certain cases, there may not be digital calendar data to assemble (or gain easily) and it human effort may be required to continually input data, and continually refine existing data.

f. Crowd Sourcing

The invention may also seek and accept "crowd sourcing" and "wiki" like capabilities and applications that encourages an "open source" approach to making the data more complete and more usable. Allowing users to modify, customize the grid for their purposes, and allowing users to post/edit information that is designated as "open".

In a further aspect provided by the present disclosure, the present invention may utilize a number of known Internet revenue producing techniques, some of which are specific to current search engine business models, including:
- sponsored links (advertisements)
- 'banner advertisements' and media clips, commercials
- sponsorship of day, week, month & time slots in the future
- user data/trend analysis
- simple forms of the grid for free usage, and premium & deluxe forms of the grid payable by monthly or annual subscription fee
- subscription model for the publishers of commercial content
- partnership with a event organizers/ticket sales (resulting in a revenue share with the organizer, or retrocessionary fee)
- partnership with provider of web-based maps, or other data services Examples of data which may be searched by the present invention:

a. All Public Calendars Currently Available

All online, publicly available calendars, and calendars currently existing in hardcopy only (recreated via manual input)

Such as all:
- public holidays & religious observances in public domain
  - i.e. on Wikipedia, or generally published by newspapers . . .
- government/legislative schedules (Fed, State, Local)
  - i.e. town hall meetings, library hours, post office hours, recycling and trash pick up, tax deadlines . . .
- public company information/market information
  - earnings, quarterly and annual meetings . . .
- community groups and gatherings open to the public
  - i.e. green preservation, health screenings, social causes, book fairs . . .
- school schedules
  - i.e. holidays, school sports events, school fundraisers, school musicals and performances, school sponsored philanthropic events . . .
- sports schedules
  - i.e. professional & college sports, motor sports, horse racing . . .
- recreation schedules
  - i.e. nature hikes, events at public parks, races (e.g "Susan G. Komen Race for the Cure"), namely any event that is trying to attract attendees & sponsorship . . .

b.) Any Private Calendars 'Posted' Voluntarily

Any calendars as 'private' or as 'public' as desired by posting user, and for viewing, editing as permitted by user(s).

Calendar may be strictly personal, shared with as little as one person, or open to a group of people (family & friends), open to voters, stockholders, group members, or entirely public.
- individuals
  - Personal calendar for sharing with a spouse & family, or to their contact lists, or social community. Some individuals may even allow their entire personal calendar to be viewable to anyone . . .
  - i.e. family reunions, to family & friends social events, to dental exams . . . corporations Corporate may publish "internal calendars" to allow employees to add data to their personal calendar (corporate events, plant closures, public service events . . .
- non-profits
  - i.e. weekly meetings, conference calls, fundraisers, volunteer events . . .
- religious groups
  - religious observances, service schedules & times, volunteerism, 'sunday school' times/locations . . .
- community groups & co-ops
  - political action campaigns, rallies, protests, marches, time/date/place specifics for group members . . .
- informal gatherings
  - i.e. "book clubs", hobby groups, recreational sports . . .

c.) "Passive Data Feeds"
- Weather forecasts
  - i.e. local and regional weather, tide reports, sunrise & sunset . . .
- Traffic
  - i.e. road closures, detours . . .
- Market Information
  - i.e. unemployment reports, commodity futures . . .
- Entertainment
  - i.e. TV, cable, movie, cultural event listings . . .
- "News"—upcoming "news worthy events"
  - i.e. a future wedding of Prince Harry, Inauguration, State of the Union, parades . . .

Figure 3:
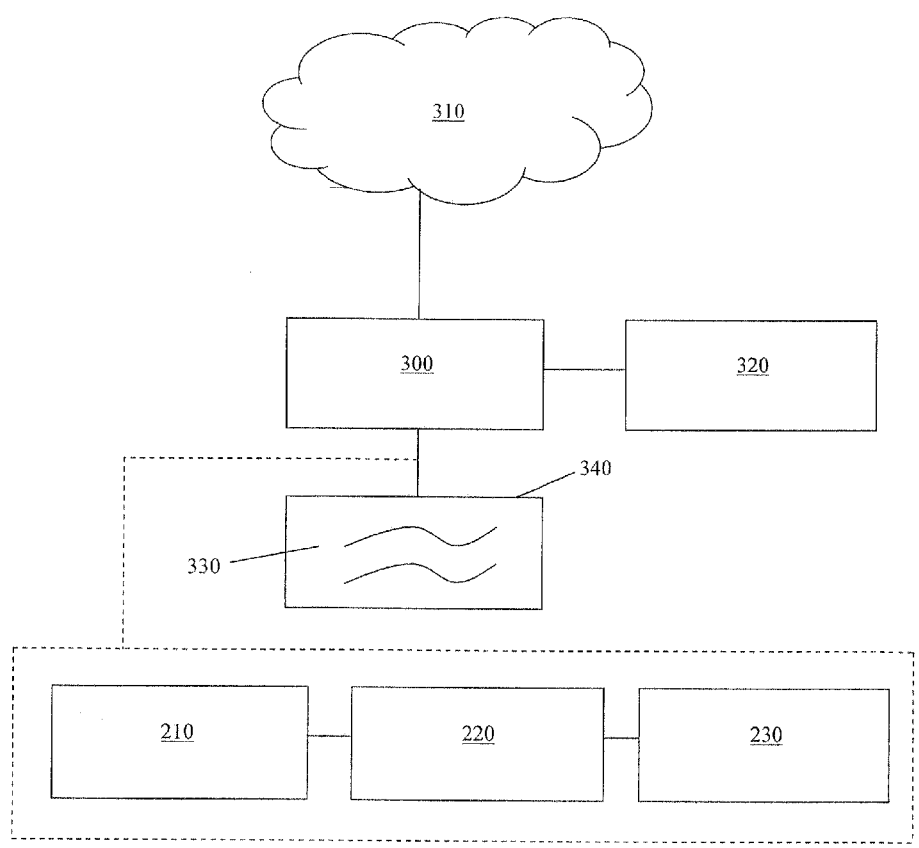
FIG. 3 is a flow chart showing the method of performing a search and displaying results of the search in accordance with the present invention.

FIG. 3 is a flowchart for a method of performing a search provided by the present invention, and FIG. 4 illustrates a system for performing a search and for displaying the results of the search according to the present invention. A processor 300 connected to the web 310 executes computer readable instructions stored on a computer-readable memory unit 320 to: provide a graphical image 330 representing a search engine interface for display on a screen 340 of the computer system, wherein the search engine interface comprises an arrangement of cells, each cell representative of a calendar unit of time (step 210); cause performance of a search, upon selection of a particular cell, wherein said search is specific to the unit of time represented by the selected cell (step 220); and display the results of the search (step 230).

A further example of the invention is given in Appendix B.

Various changes may be made in the invention without departing from the spirit and the scope thereof. It should be emphasized that the above-described embodiments of the present calendar-based search engine are merely possible examples of implementations and are merely set forth for a clear understanding of the principles of the invention. Many different embodiments of the calendar-based search engine described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

What is claimed is:

1. A computer device including a computer-readable memory unit, a processor, and graphical user interface for performing a web search, the graphical user interface comprising:

an arrangement of cells configured to be displayed on the computer device, each cell of the arrangement of cells representative of a calendar unit of time, wherein at least a portion of the arrangement of cells is representative of a future calendar unit of time, wherein a web search for future web-based information is performed upon selection of a particular cell of the portion of the arrangement of cells by a user, wherein said web search is performed based only on the unit of time represented by the selected cell and returns web search results having only information date-specific to the selected cell, wherein said web search is refined when one or more search terms are entered via the graphical user interface, wherein said refined web search is performed based on both the unit of time represented by the selected cell and the one or more search terms entered.

2. The computer device of claim 1, wherein said arrangement of cells represents a particular month and each cell represents a particular day within said month.

3. The computer device of claim 1, wherein said web search is further based on location information.

4. The computer device of claim 3, wherein said location information is provided by the user.

5. The computer device of claim 3, wherein said computer device is operable to obtain a geographic location of said computer device and said location information comprises the obtained geographic location.

6. The computer device of claim 1, wherein said cells are further configured to display user-inputted information.

7. A computer system comprising:
a computer-readable memory unit; and
a processor coupled to the memory unit, the processor configured to:
provide a graphical image representing a search engine interface for display on a screen of the computer system, wherein the search engine interface comprises an arrangement of cells, each cell representative of a calendar unit of time, wherein at least a portion of the arrangement of cells is representative of a future calendar unit of time;
cause performance of a web search for future web-based information, upon selection of a particular cell of the portion of the arrangement of cells, wherein said web search is based only on the unit of time represented by the selected cell and returns web search results having only information date-specific to the selected cell, wherein said web search is refined when one or more search terms are entered via the graphical user interface, wherein said refined web search is performed based on both the unit of time represented by the selected cell and the one or more search terms entered; and
display the results of the search.

8. The computer system of claim 7, wherein said arrangement of cells represents a particular month and each cell represents a particular day within said month.

9. The computer system of claim 7, wherein said web search is further based on location information.

10. The computer system of claim 9, wherein said location information is provided by the user.

11. The computer system of claim 9, wherein said computer system is operable to obtain a geographic location of said computer device and said location information comprises the obtained geographic location.

12. The computer system of claim 7, wherein said cells are further configured to display user-inputted information.

13. A method of performing a search using a processor to execute computer readable instructions stored on a computer-readable memory unit, the method comprising:
providing a graphical image representing a search engine interface for display on a screen of the computer system, wherein the search engine interface comprises an arrangement of cells, each cell representative of a calendar unit of time, wherein at least a portion of the arrangement of cells is representative of a future calendar unit of time;
causing performance of a search for future web-based information, upon selection of a particular cell of the portion of the arrangement of cells, wherein said search is based only on the unit of time represented by the selected cell and returns search results having only information date-specific to the selected cell, wherein said web search is refined when one or more search terms are entered via the graphical user interface, wherein said refined web search is performed based on both the unit of time represented by the selected cell and the one or more search terms entered; and
displaying the results of the search.

14. The method of claim 13, wherein said arrangement of cells represents a particular month and each cell represents a particular day within said month.

15. The method of claim 13, wherein said web search is further based on location information.

16. The method of claim 15, wherein said location information is provided by the user.

17. The method of claim 15, wherein said computer system is operable to obtain a geographic location of said computer device and said location information comprises the obtained geographic location.

18. The method of claim 13, wherein said cells are further configured to display user-inputted information.

* * * * *